UNITED STATES PATENT OFFICE.

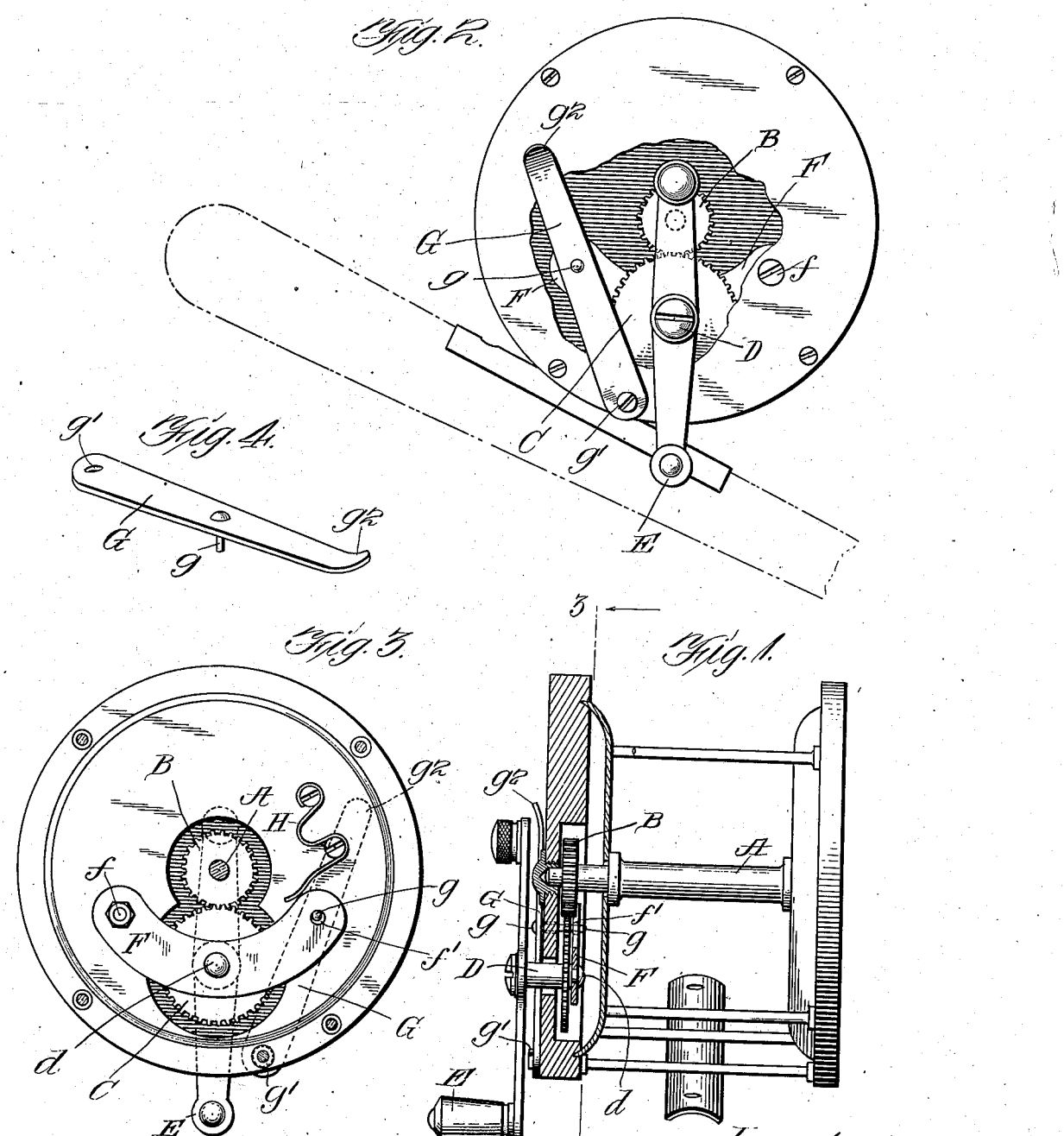

BERNARD A. FLYNN, OF NEW YORK, AND FREDRICK CHARLES ROTHENBERGER, OF BROOKLYN, NEW YORK.

FISHING-REEL.

No. 900,842.

Specification of Letters Patent.

Patented Oct. 13, 1908.

Application filed May 7, 1908. Serial No. 431,431.

*To all whom it may concern:*

Be it known that we, BERNARD A. FLYNN, a citizen of the United States, residing in the city, county, and State of New York, and FREDRICK CHARLES ROTHENBERGER, a citizen of the United States, residing in Brooklyn, in the county of Kings and State of New York, have invented certain new and useful Improvements in Fishing-Reels, of which the following is a specification.

The object of our invention is to provide a fishing reel of simple construction with the working parts so arranged that the line may be quickly and easily wound when desired by a geared handle; which may have the geared handle easily disconnected for casting off and paying out freely, and which may be quickly geared with the handle again for rewinding.

In carrying out our invention we provide the rotary central spindle of the reel with a pinion meshing with a spur wheel of larger diameter connected to rotate with the handle, which latter is pivotally connected with a plate or support hinged to the frame of the reel. The support of the handle is normally held by a catch, of simple construction, in such manner as to cause the drive wheel carried by the handle to engage the pinion of the spindle, but the catch may be easily disengaged to permit the handle support and the drive wheel carried thereby to be moved by a spring out of engagement with the pinion. The construction is also such that by merely moving the handle radially inwards, the catch may be made to again engage the handle support and thus lock the drive wheel in mesh with the spindle pinion.

In the accompanying drawings,—Figure 1 is a view partly in front elevation and partly in section of a fishing reel embodying our improvements. Fig. 2 is a view partly in end elevation with parts broken away of the same. Fig. 3 shows a vertical transverse section on the line 3—3 of Fig. 1 looking in the direction of the arrows. Fig. 4 is a perspective view of the catch which holds the drive wheel in engagement with the spindle pinion.

The reel spool and its frame may be of any suitable construction. The winding spindle A is mounted in suitable bearings in the frame, as indicated, and it carries a pinion B which is adapted to mesh with a spur wheel or drive wheel C of considerably larger diameter. The stud axle D of this drive wheel is connected with a handle E, of usual form, and this stud axle is pivotally mounted at $d$ in a support F which is preferably made segmental in shape, as indicated in Fig. 3, and is pivotally connected or hinged at $f$ to the frame of the reel. The support F is held in such manner as to cause the drive wheel C to engage the pinion B by means of a catch G in the form of a spring plate, as indicated in Fig. 4, carrying a stud or pin $g$ which is adapted to engage a hole in the outer end of the plate F. The catch G is attached at $g'$ to the outside of the frame. The pin or stud $g$ is arranged between the opposite ends of the catch and the outer end $g^2$ of the catch is turned outward slightly to provide a convenient handle. When the stud or pin $g$ engages the hole $f'$ in the plate F, the drive wheel is made to engage the pinion and the reel spool can be turned rapidly to wind a line. The support F is, however, held in place against the tension of a spring H attached to the frame of the reel, as indicated, and bearing against the outer end of the support. When the catch is withdrawn from engagement with the support, the spring H causes the support to be swung about its hinge or pivot and to withdraw the drive wheel from the pinion. When the parts are in this condition the line may be cast off or paid out quickly and easily.

In order to restore the parts to winding condition, the handle may be pressed radially inwards until the stud $g$ engages the support F, and when thus engaged, the drive wheel will be held in mesh with the pinion.

It will be observed that the spring plate G is attached at $g'$ to the outside of the reel near the rod seat and that the plate extends diagonally upwards and rearwards in a plane between the path of the handle and the adjacent side of the reel. The outer end $g^2$ of the spring plate being turned outward, as indicated, affords a ready means by which the fisherman may operate the catch with his hands still on the rod. When the catch is withdrawn, it will stand in the path of the handle so that the latter cannot rotate when the drive wheel is out of gear with the pinion. This is an advantage because if the handle rotated at this time, there would be liability of the line being entangled with the handle. The catch plate G being on the outside can be easily removed or replaced and the catch pin $g$ acts as a positive lock for the segmental plate F, which cannot be detached without a positive outward movement of the plate.

While the construction is extremely simple, involving but few parts, it is very efficient in operation and can be easily manipulated.

Our improvements are especially intended for use in fishing reels, but they may be used in reels employed for other purposes.

We claim as our invention,—

1. In a fishing reel, the combination of the reel frame, the winding spindle mounted to turn therein, a pinion on the spindle, a driving wheel engaging the pinion, a handle connected with the driving wheel, a segmental plate pivotally connected at one end to the frame of the reel having an aperture at its opposite end and centrally connected with the drive wheel and handle, a spring engaging the outer free end of the segmental plate and tending to separate the drive wheel and pinion, and a spring metal catch plate attached at one end to the side of the reel near the rod seat provided with a catch pin adapted to engage the aperture in the segmental plate and having its outer end turned to form a handle lying at the side of the reel above the rod seat.

2. In a fishing reel, the combination of the reel frame, the winding spindle mounted to turn therein, a pinion connected with the spindle, a driving wheel engaging the pinion, a handle connected with the driving wheel, a segmental plate pivotally connected at one end to the frame of the reel having an aperture at its opposite end and centrally connected with the driving wheel and handle, a spring engaging the outer free end of the segmental plate and tending to separate the driving wheel and pinion, and a spring metal catch plate attached at one end to the outside of the reel near the rod seat extending diagonally upwards and rearwards therefrom in a plane between the path of the handle and the side of the reel and which when the catch is disengaged from the segmental plate moves into the path of the handle and prevents it from rotating, and a catch pin carried by the catch plate intermediate its end adapted to engage the aperture in the segmental plate.

In testimony whereof, we have hereunto subscribed our names.

BERNARD A. FLYNN.
FREDRICK CHARLES ROTHENBERGER.

Witnesses:
FRANCIS T. REILLY,
JOHN T. MURPHY.